UNITED STATES PATENT OFFICE.

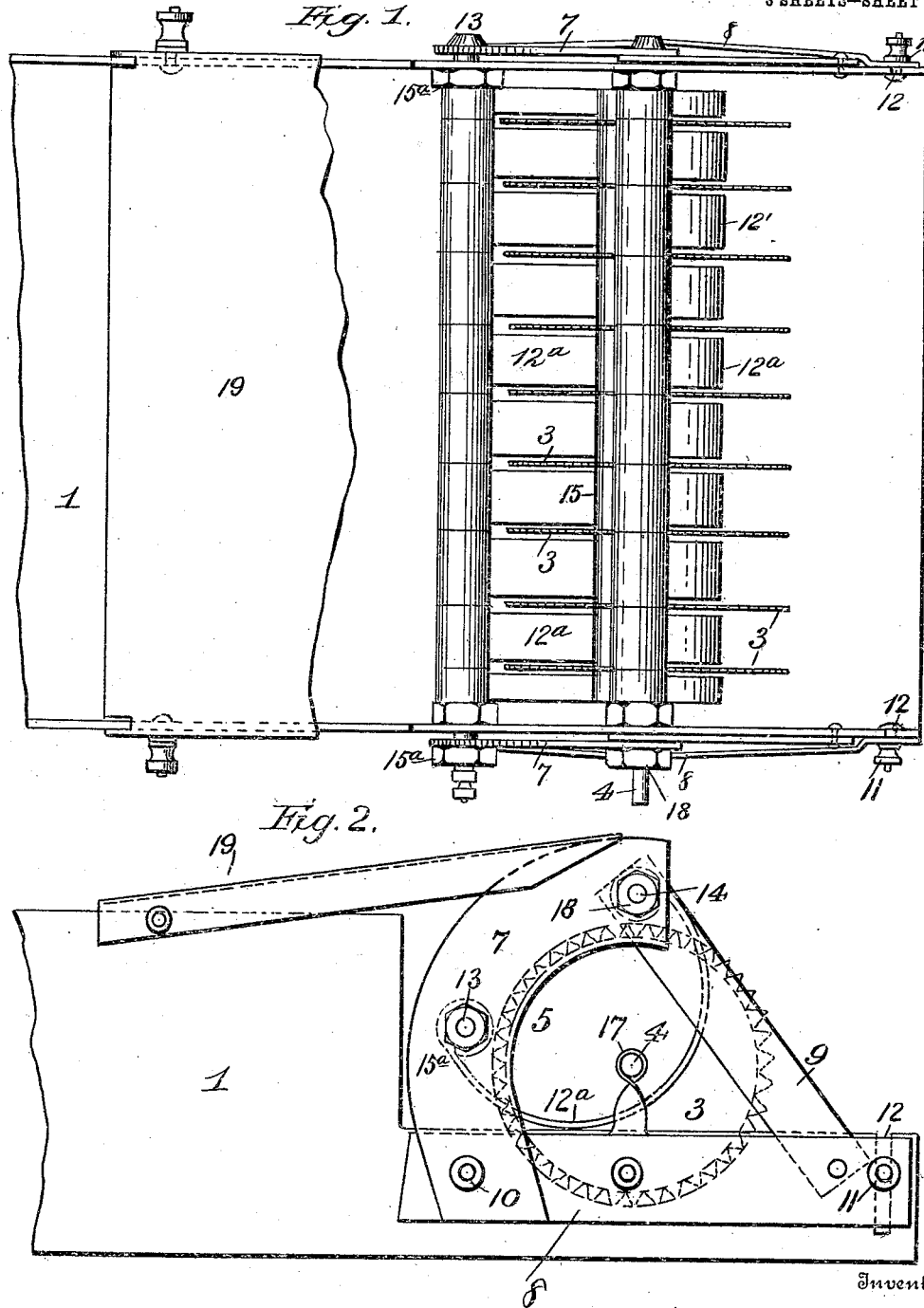

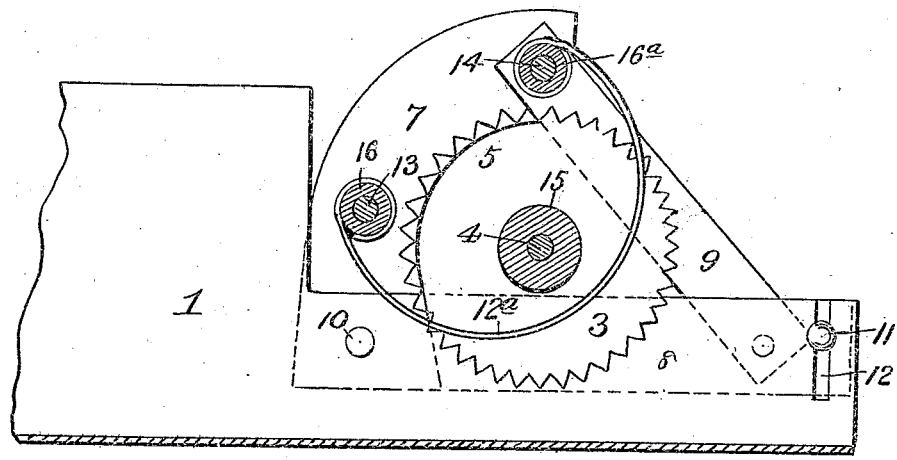
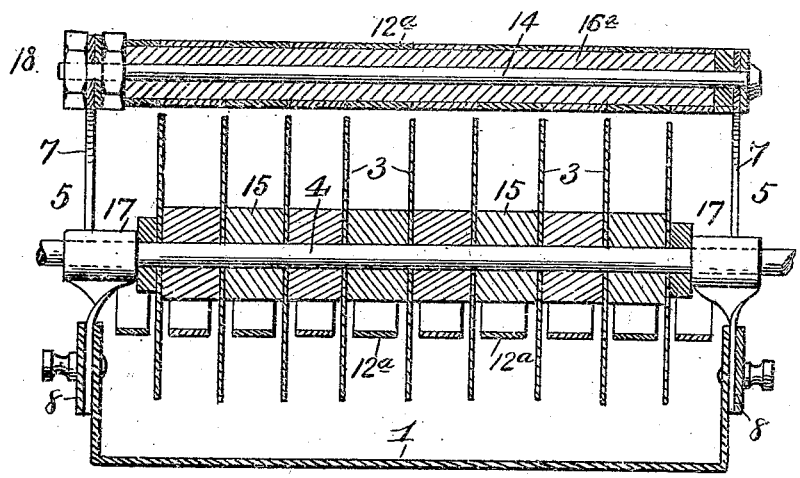

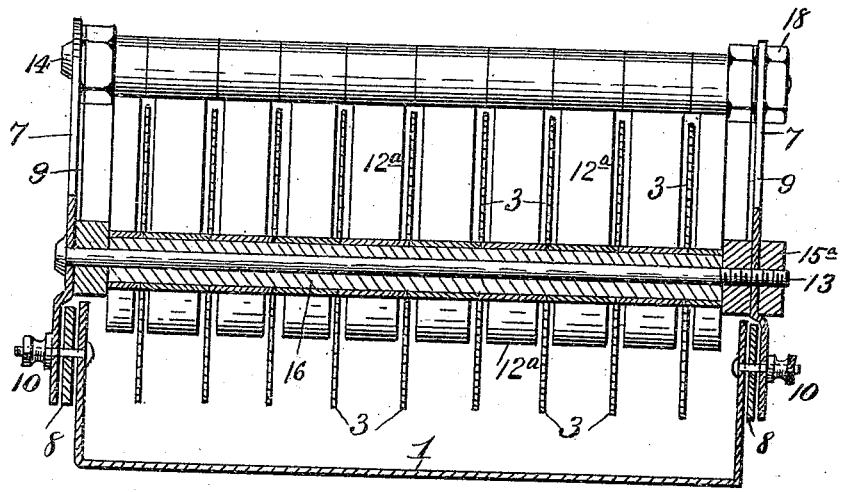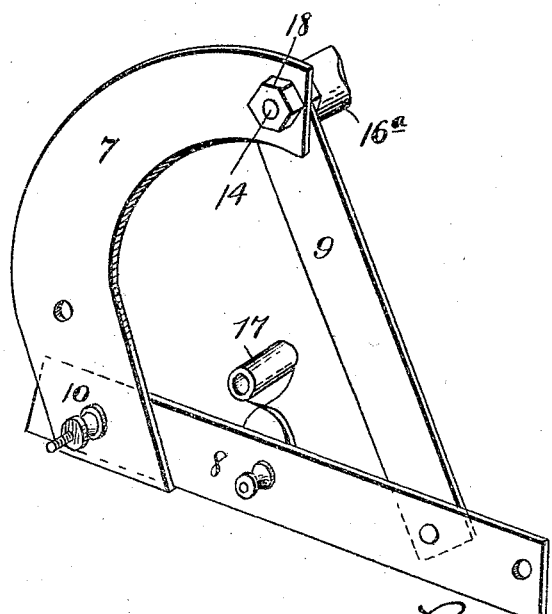

EVERETT McREYNOLDS AND PHILIP S. GRAHAM, OF FENNIMORE, WISCONSIN.

BAND-CUTTER AND FEEDER FOR THRESHING-MACHINES.

959,432.  Specification of Letters Patent.  Patented May 24, 1910.

Application filed August 31, 1907. Serial No. 390,979.

*To all whom it may concern:*

Be it known that we, EVERETT McREYNOLDS and PHILIP S. GRAHAM, citizens of the United States, residing at Fennimore, in the county of Grant and State of Wisconsin, have invented certain new and useful Improvements in Band-Cutters and Feeders for Threshing-Machines, of which the following is a specification.

Our invention relates to an improvement in band cutters for threshing machines, and the object is to provide for the severing of the binding band of the grain bundles or sheaves as they are fed to the machine, and to provide means to prevent the winding or twisting of the straw around the saw or cutter-carrying shaft.

Our invention relates to certain other novel features of construction and combinations of parts which will be hereinafter described and pointed out in the claims.

In the accompanying drawings Figure 1 is a plan view; Fig. 2 is a side elevation; Fig. 3 is a longitudinal sectional view; Fig. 4 is a transverse section on the line of the axis of the upper securing rod of the strippers; Fig. 5 is a transverse section on the line of the lower securing rod of the strippers, and Fig. 6 is a detail view of one end of the frame.

The receptacle or chute 1 is connected to the ordinary threshing cylinder, (not shown) and 3, 3 are a series of cutters preferably in circular saw form and mounted upon a shaft 4, and intermediate of these cutters and mounted on the shaft 4 are sleeves 15 which hold the cutters the desired distance apart.

Removably secured on each side of the receptacle 1 is a frame 5, which is composed of base members 8, which are connected to the chute by nut screws 11 which are received in the elongated slots 12 of the chute. Curved arms 7 are pivotally and adjustably connected to the chute 1 by screws 10 passing through the chute and the arms 7 and base members 8. Pivotally connected to the base members 8 are members 9 which extend upwardly and are connected to the curved arms 7 by the bar 14 and held thereto by the nut 18 and head of the bar 14, the members 9 forming braces for the bar 14. The shaft 4 is supported upon the base members 8 by standards 17, 17, which are removably secured to the base members 8. Surrounding the bar 14 is a cylinder $16^a$, and mounted on this cylinder are strippers $12^a$, $12^a$, which extend down beneath the shaft 4, and between the cutters 3, 3 and extending upwardly to the bar 13 carrying a tube 16, on which the strippers are mounted. This bar 13 is mounted on the curved arms 7 of the frames 5 and secured thereto by a nut $15^a$. A cover 19 connected with the upper portion of the chute extends over the cutters 3, and rests upon the curved arms 7.

The operation of the device is as follows:—As the grain is fed to the cutters 3, 3 they are caused to revolve, cutting the bands which hold the grain together, and the grain passes on through the chute 1 to the cylinder of the threshing machine, the cover 19 tending to keep the grain from going over the sides of the chute. The strippers $12^a$ being lower at the discharge end of the chute, keep the grain down so that the cutters are sure to cut the band, thereby releasing the band and at the same time permitting the grain to pass on through to the cylinder. The strippers also prevent the grain from buckling or turning back and winding onto the collars 15 on the shaft 4. In case the grain is in small bundles or is loose and being fed to the chute in small quantities the cutters can be lowered by means of the frames 5 through the slots 12 in the chute by releasing the nuts on the screws 11 and permitting the ends of the frames to drop down to the base of the slot.

Having fully described our invention, what we claim as new and desire to secure by Letters Patent is:—

1. In a band-cutter for threshing machines, the combination with a chute, of base members connected to the chute, curved arms connected to the base members, members connected to the base members and curved arms, a bar supported at each end by an arm and member, a cutter-shaft mounted on the base members and having cutters mounted thereon, and strippers mounted on the bar and passing beneath the cutter-shaft and between the cutters.

2. In a band-cutter, the combination with a chute, of base members mounted upon the chute, standards on the base members, a shaft mounted on the standards, cutters mounted on the shaft, curved arms connected to the base members, members pivotally connected to the base members and curved arms, a bar supported at each end upon an arm and a member, strippers connected to the bar extending between the cutters, and means for supporting the strippers.

3. In a band-cutter, the combination with a chute, of base members adjustably mounted thereon, standards connected to the base members, a shaft mounted on the standards, cutters mounted on the shaft, curved arms connected to the base members, members pivotally connected to the base members and curved arms, a bar supported at each end upon an arm and a member, strippers upon the bar extending between the cutters, and means for supporting the strippers upon the arms.

4. In a band-cutter for threshing machines, the combination with a chute, of base members adjustably connected to the chute, curved arms connected to the base members, members connected to the base members and curved arms, a bar supported at each end by an arm and member, a cutter-shaft mounted on the base members and having cutters mounted thereon, strippers mounted on the bar and passing beneath the cutter-shaft and between the cutters, and a bar supported by the arms for supporting the strippers.

In testimony whereof we affix our signatures, in presence of two witnesses.

EVERETT McREYNOLDS.
PHILIP S. GRAHAM.

Witnesses:
  D. T. Parker,
  Will Mauer.